United States Patent [19]

Dickson et al.

[11] 4,079,104

[45] Mar. 14, 1978

[54] METHOD FOR HEATING PLASTIC ARTICLES

[75] Inventors: Andrew C. Dickson, Toledo, Ohio; Richard A. Morrette, Temperance, Mich.

[73] Assignee: Owens-Illinois, Inc., Toledo, Ohio

[21] Appl. No.: 677,600

[22] Filed: Apr. 16, 1976

[51] Int. Cl.² .................. B29C 17/07; F27B 9/06; H05B 1/00
[52] U.S. Cl. ................... 264/25; 219/343; 219/349; 219/377; 219/388; 264/94; 264/327; 425/174.4; 425/526; 432/10; 432/11
[58] Field of Search ............ 264/25, 94, 97-99, 264/327; 425/174.4, DIG. 208, 526; 432/10, 11, 124; 219/341, 343, 347-349, 342, 354, 388, 405, 411, 531, 377

[56] References Cited

U.S. PATENT DOCUMENTS

| 3,003,409 | 10/1961 | Mills | 219/411 X |
| 3,114,822 | 12/1963 | Boland | 219/343 X |
| 3,240,915 | 3/1966 | Carter et al. | 219/343 |
| 3,533,352 | 10/1970 | Miller | 425/384 X |
| 3,715,109 | 2/1973 | Gilbert | 219/388 X |
| 3,862,397 | 1/1975 | Anderson et al. | 219/343 X |
| 3,865,912 | 2/1975 | Rosenkranz et al. | 264/25 X |
| 3,972,127 | 8/1976 | Hoshi et al. | 219/343 X |
| 3,975,618 | 8/1976 | Goos et al. | 264/25 X |

FOREIGN PATENT DOCUMENTS

| 2,352,926 | 4/1975 | Germany | 264/94 |
| 745,700 | 2/1956 | United Kingdom | 219/343 UX |

Primary Examiner—Jan H. Silbaugh
Attorney, Agent, or Firm—Richard D. Heberling

[57] ABSTRACT

A method are disclosed for heating thermoplastic parisons to a substantially uniform temperature across their wall thickness prior to a blow molding operation. In the method, the parisons are rotated about their longitudinal axes while being conveyed adjacent a thermal conditioning means, which includes vertically spaced radiant heating elements and a gaseous cooling source. The heating elements radiate infra-red rays having a wave length to penetrate and heat the full thickness of the parison wall; whereas the gaseous cooling source directs a stream of air onto the surface of the parison facing the heating elements to prevent the parison surface from being overheated. Additionally, each of the heating elements may be individually regulated so that the parisons can be differentially heated along their axes to control the wall thickness of the final blown articles.

9 Claims, 3 Drawing Figures

METHOD FOR HEATING PLASTIC ARTICLES

BACKGROUND OF THE INVENTION

This disclosure relates to a method for heating thermoplastic pre-forms, such as parisons, by a radiant energy source prior to a blow molding operation.

Plastic pre-forms and parisons have been heated prior to blow molding operations in the prior art typically by placing the parisons adjacent electrical heating bands or coils. This arrangement produced at least four undesireable results. First, a relatively high heat differential or gradiant was established across the thickness of the parison wall, which is undesireable during the blow molding operation. Second, in order to bring the inner portion of the parison to a blowable temperature, the outer parison surface was often overheated. This was completely unacceptable for certain types of materials, such as polyethylene terephthalate which crystallizes at elevated temperatures. Third, the heat distribution along the axis of the parison was erratic because of localized hot segments nearest each electrical band, resulting in undesireable thinned or thickened sections in the final blown article. Fourth, the electrical heating bands did not satisfactorily vary the parison temperature along the axis of the parison to control the thickness in the final article, because the bands produced sharp transition temperatures along the axis rather than smooth temperature gradiants.

Several attempts have been made to overcome these prior art problems, including the use of various radiant heating means.

One such radiant heating includes a nicrome heating element within a quartz envelope. This particular heating element did not sufficiently heat the inside surface of the parison, apparently because the infra-red energy waves did not sufficiently penetrate the parison wall. In order to adequately heat the interior of the parison, it became necessary to extend the time period that the parison was exposed to the heating element. This, however, resulted in a loss of cycle time in the overall operation and overheated the parison at its outer surface. Additionally, this arrangement did not provide a smooth temperature gradiant between differentially heated segments of plastic parisons.

SUMMARY OF THE INVENTION

The present invention overcomes these prior art problems in a method where thermoplastic parisons are conveyed in heat exchange proximity to a thermal conditioning means, which includes (a) a source of gaseous coolant directed toward the parison and (b) a plurality of elongated, generally horizontal, vertically spaced radiant heating elements interposed between the source of gaseous coolant and the parisons. While the parisons are adjacent the thermal conditioning means, they are rotated in order to continuously expose different circumferential portions thereof to simultaneous heating and cooling. During the method, the parisons are thermally conditioned to a substantially uniform temperature across their wall thickness by the simultaneous (a) penetration of the thickness of that circumferential portion of the parison that is exposed to the thermal conditioning means by infra-red rays from the radiant heating elements and (b) impingement of coolant air onto the outer surface of the same circumferential parison portion that is exposed to the radiant heating elements.

The preferred embodiment of the invention is highly desireable for use in conjunction with plastic parisons formed of polyethylene terephthalate material. In this embodiment, the radiant heating elements provide radiant waves with a spectral energy peak wave length of about 1.2 microns, which penetrate the full wall thickness of a typical parison. In the most preferred embodiment, the heating elements consist of tungsten filaments encased within a quartz tube, which are capable of establishing a highly uniform temperature across the parison wall thickness, the temperature gradiant preferably not exceeding 5° to about 10° C.

The most preferred embodiment also includes separate electrical current control means for each of the heating elements. This enables differentially heating a parison along its axis to control the wall thickness in the final blown article. Additionally, semi-cylindrical reflectors, comprised of such materials as polished aluminum or stainless steel, are moveable with the parisons to reflect infra-red rays back onto that portion of the parison facing away from the heating elements.

Accordingly, the present invention provides at least the following advantages over the prior art: (1) the ability to adequately heat the inner portion of the parison to a blowable temperature without overheating the parison surface; (2) the capability of uniformly heating the parison across its wall thickness to within a maximum temperature gradient of no more than about five to ten degrees centigrade; and (3) the capacity for differentially heating longitudinal segments of the parison and having a smooth temperature gradient between those segments, rather than sharp temperature differences.

These and other advantages and meritorous features will be more fully appreciated from the following detailed description and the appended claims.

DETAILED DESCRIPTION OF THE PREFERRED EMBODIMENTS

The present invention broadly deals with the method and apparatus for heating thermoplastic pre-forms, such as parisons, from room temperature to a blowable temperature by the use of radiant heaters and a gaseous coolant source.

Figure 1:
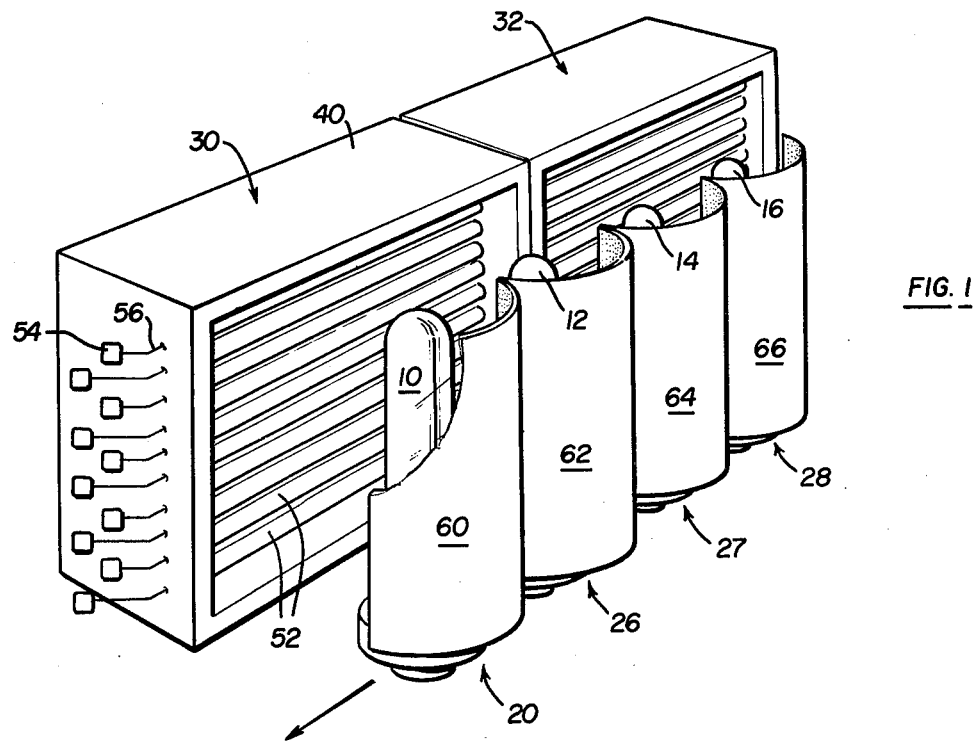
FIG. 1 is a schematic perspective view, illustrating a plurality of parisons being conveyed adjacent to a thermal conditioning means preparatory to a blow molding operation.

Referring to the drawings, FIG. 1 illustrates a plurality of pre-forms 10, 12, 14 and 16 as they are conveyed in succession in the indicated direction on respective support mandrels 20, 26, 27 and 28 adjacent a pair of modular thermal conditioners 30 and 32. Of course, more thermal conditioners may be arranged in a side-by-side relationship along the pre-form path of movement if needed, in order to properly achieve the desired pre-form temperature. The precise number of these units will be dependent upon the speed at which the pre-forms are conveyed and upon the desired pre-form temperature.

Figure 2:
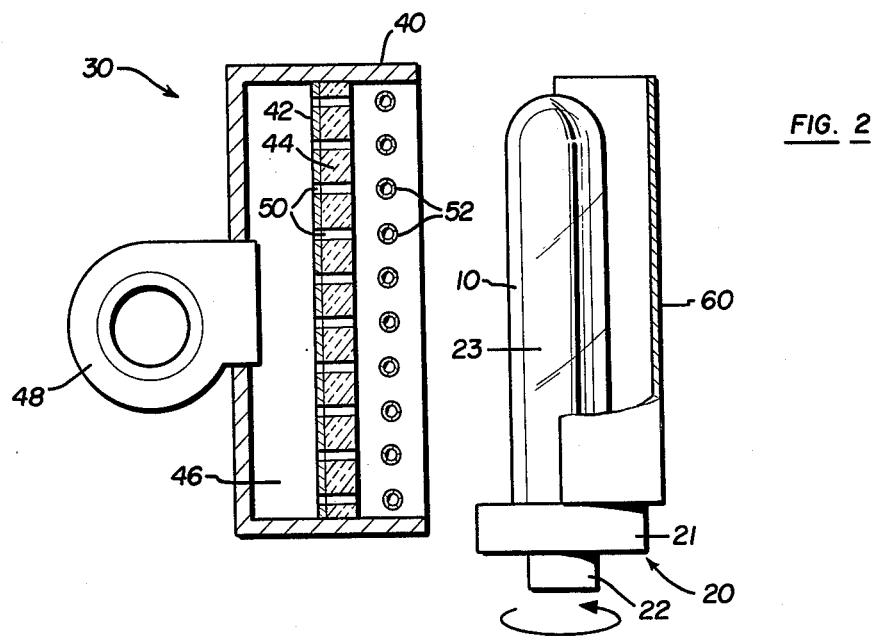
FIG. 2 is a schematic elevational view illustrating a parison in heat exchange proximity to a thermal conditioner.

FIG. 2 illustrates that the thermal conditioners include a box-shaped frame 40. A panel comprised of a steel backing member 42 and a refractory material 44, such as ceramic, extends across the four walls of the frame 40 to form a plenum 46. Air under pressure is delivered to the plenum 46 by a fan 48 of conventional design. A plurality of air delivery ports 50 extend through the panel of the thermal conditioner to direct air from the plenum onto a plurality of horizontal infrared heating elements 52 and toward the pre-forms. Air from the delivery ports serves to cool the heating elements 52 to extend their life and to cool the outer surface of the pre-forms to prevent overheating of the outer pre-form surface. The air flow rate may be chosen as desired to achieve the desired cooling effect on the pre-form outer surfaces.

In the most preferred embodiment, the heating elements 52 consist of tungsten filaments encased within a quartz tube, providing a highly desireable infra-red wave length to completely penetrate the wall thickness of the pre-forms.

Thermal conditioners providing the desired characteristics for this invention are commercially available from Research Inc. under the name Pyropanel, which are apparently manufactured under U.S. Pat. No. 3,436,524, incorporated by reference. The specific heating elements of the Pyropanel provide a spectral energy peak wave length of about 1.2 microns at 100% output, which has been found by Applicants to provide a highly desireable uniform temperature across the thickness of the pre-forms. By appropriately spacing the pre-forms from the heating elements in the thermal conditioners, for example in the range of from about 1 to 2 inches, the temperature gradiant at substantially all radial positions of the pre-form can be controlled not to exceed more than about 5° to 10° C. For example, if the parison outer surface is heated to 105° C, the inner surface temperature should be at least 95° C, and more likely 100°–105° C.

In another of the most preferred embodiments, the heating elements are electrically interconnected so that their radiant energy output may be varied in order to differentially heat the pre-forms along their axis. The heating elements in the commercially available Pyropanel are wired in parallel and therefore provide the same radiant energy output. The present invention contemplates revising this unit to provide a terminal block and a separate heat control for each heating element. This is shown in FIG. 1, where a plurality of variable heat controls 54, such as rheostats or variable resistors, are illustrated as being electrically interconnected by leads 56 to respective individual heating elements 52. The reduction in wave length by varying the current supply to the heating elements by the heat controls 54 is not drastic until the electrical current is reduced by about 50%. Most portions of the pre-form require that the supply of electrical current be significantly greater than 50% of the rated capacity, therefore the wave length of the infra-red rays from substantially all of the heating elements will be approximately 1.2 microns or slightly less. The spacing of the heating elements 52 and their energy output enables differentially heating longitudinal segments of the pre-forms with smooth transition temperatures between each of the longitudinal pre-form segments.

Figure 3:
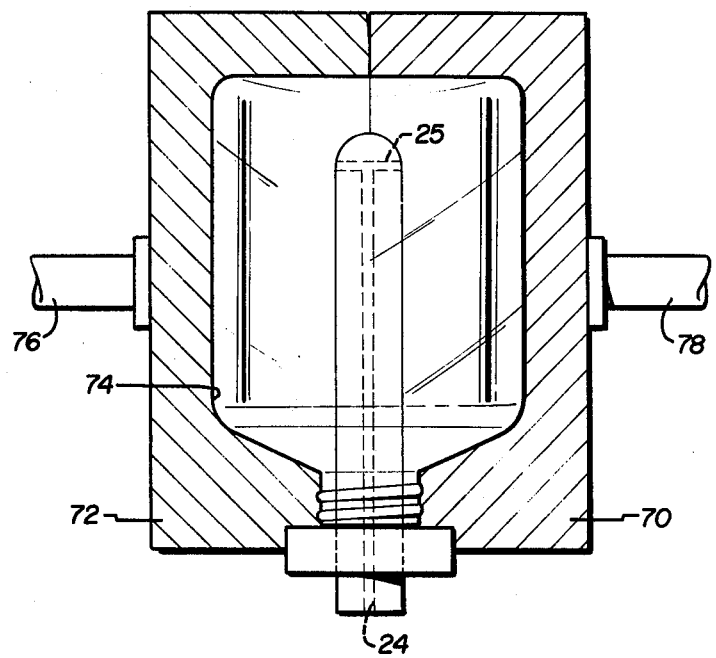
FIG. 3 is a schematic side elevational view, illustrating a heated parison in a mold cavity defined by the sections of a blow mold.

The pre-forms are conveyed adjacent the thermal conditioners on mandrels, which are comprised of a base 21, a lower cylindrical extension 22 and an internal cylindrical support 23 extending the full length of the parison. This same mandrel may be used to supply blow air to the pre-form during the blow molding operation, in which case the mandrel includes an axial bore 24, as illustrated in FIG. 3, extending substantially the entire length of support 23 and terminating in radial ports 25.

As indicated in FIG. 2, the mandrels are rotated as they are conveyed past the thermal conditioners in order to expose the entire circumferential periphery of the pre-forms to the heating elements. The rotational movement may be affected by a gear sprocket (not shown) on the mandrel which engages a stationary rack. Alternatively, a frictional pulley element may be used to engage a groove (not shown) on the cylindrical extension 21 of the mandrel. In either case, the mandrels may be laterally moved by a conventional transfer mechanism, such as that shown in U.S. Pat. No. 3,599,280, incorporated by reference. The transfer mechanism does not form a part of this invention and therefore is not illustrated.

Optional semi-cylindrical reflectors 60, 62, 64, and 66 may be used to reflect rays from the heating elements 52 onto the back-side of the pre-forms. These reflectors may be attached to the same mechanism which conveys the mandrels, but are not, in preferred embodiment, attached to the mandrels. Any reflective material such as polished aluminum or stainless steel, may be utilized.

In operation, pre-forms are successively placed on mandrels, which are then conveyed in a predetermined path adjacent a bank of thermal conditioners comprised of radiant heating elements. As the pre-forms are in heat exchange proximity to the radiant heating elements, infra-red rays penetrate the full thickness of the pre-form wall to raise the temperature of the pre-forms to within the range require for blow molding. The most preferred embodiment, which includes the commercially available Pyropanel, provides the capability of heating the parison wall so that the inner and outer surfaces do not vary more than about 5° to 10° C. In order to uniformly heat the pre-forms about their entire periphery, the mandrels are rotated while adjacent the heating elements. At the same time, cooling air is directed onto the outer surface of the pre-forms to prevent overheating at the outer surfaces, which could result in thermal degradation of certain thermal plastic materials.

The length of time that the pre-forms are maintained in heat exchange relationship to the heating elements depends upon several factors, including the specific thermoplastic material, the desired temperature for blowing, the thickness of the pre-form, and the spacing of the pre-form from the heating elements. When heating pre-forms of polyethylene terephthalate material, for which this invention was primarily developed, it is desirable to heat the pre-forms to a temperature of about 110° C., requiring approximately twenty seconds to heat a 32 ounce pre-form having a wall thickness of approximately 4 millimeters.

In the most preferred embodiment, the pre-forms are spaced approximately 1¼ inch from the heating elements. It will be appreciated, of course, that FIG. 2 is a schematic illustration of the invention, and that therefore the dimensional relationships of the various components are not necessarily as shown.

After the pre-forms are heated to the desired temperature, the mandrels are transferred by somewhat conventional transfer mechanisms to a blow molding station. An example of such a transfer mechanism is shown in U.S. Pat. No. 3,599,280.

FIG. 3 illustrates the heated pre-form and mandrel as positioned in a mold cavity 74 defined by sections 70 and 72 of a blow mold. Air under pressure is then supplied through opening 24 to the radial ports 25 in order to inflate the heated pre-form to the configuration of the blow mold cavity. In the case of pre-forms formed of polyethylene terephthalate materials, the pre-forms will preferably be at a temperature within the range of from about 75° C to about 100° C at the time of blowing, in order to establish molecular orientation.

Next, the blow mold sections are opened by conventional piston rods 76 and 78. Then, the blown plastic containers are removed from the mandrels which may then be transferred back to a loading station to receive another pre-form in preparation for the heating step.

It is to be understood that the foregoing description is exemplary in nature, and not limiting. For example, portions of the invention have been described primarily in connection with polyethylene terphethalate material. Other similar materials, of course, may be heated in accordance with the present invention to achieve the same or similar advantages. Specifically, any material that has a capacity to absorb medium infra-red rays can be heated by the commercially available Pyropanel to a substantially uniform temperature across the wall thickness of the pre-form. Additionally, it may be unnecessary to rotate the pre-form in all instances, such as where the semi-cylindrical reflectors are focused to heat the "back-side" of pre-forms to a substantially uniform temperature.

Having therefore completely and fully described out invention, we now claim:

1. In a method of heating a plurality of essentially tubular parisons of polyethylene terephthalate material preparatory to blowing the parisons in a blow mold, the steps of (1) positioning the parisons in succession in heat exchange proximity to a plurality of generally parallel, substantially aligned, radiant heating elements which generate infra-red rays having a peak spectral energy wave length of about 1.2 microns to penetrate the thickness of the parisons, the longitudinal axes of the parisons being substantially perpendicular to the longitudinal axes of the heating elements; (2) rotating the parisons about their longitudinal axes during the performance of Step (1) to achieve a substantially uniform temperature around the periphery of the parisons (3) during the performance of Steps (1) and (2), impinging a gaseous coolant onto the heating elements to cool the elements and extend their life and then flowing the gaseous coolant from the heating elements onto the corresponding peripheral parison portions exposed to the heating elements to prevent the outer surface of the parison from becoming significantly hotter than the material throughout the thickness of the parison, characterized by said parisons being heated during Steps (1), (2) and (3) to a substantially uniform temperature across their wall thickness so that the maximum temperature differential across the wall thickness of the parison at any specified radial position does not exceed more than about 10° C; and (4) successively displacing the parisons from heat exchange proximity with the heating elements after the parisons have been heated to a blowable temperature.

2. The method as defined in claim 1, characterized by said parisons being heated during Steps (1), (2) and (3) to a substantially uniform temperature across their wall thickness so that the maximum temperature differential across the wall thickness of the parison at any specified radial position does not exceed more than about 5° C.

3. The method as defined in claim 1, characterized by heating the parison to a temperature of about 110° C during Steps (1), (2), and (3) with the temperature across the wall thickness of the parison at any radial position not varying by more than about 5° C and including the additional step of blowing the parison in a blow mold after Step (4) while at a temperature within the range of from about 75° C to about 100° C.

4. The method as defined in claim 1, further including the steps of closing the sections of a blow mold in succession on the heated parisons and blowing the parisons while at a blowable temperature to form a plurality of blown containers.

5. The method as defined in claim 4, further including the steps of differentially heating the parisons in their axial direction during the performance of Steps (1), (2), and (3) to vary the wall thickness of the blown containers, the temperature of the heated parisons along the direction being characterized by substantially smooth transition temperatures from the differentially heated axial parison segments.

6. In a method of thermally conditioning an essentially tubular heat degradable thermoplastic pre-form, the steps of:
(1) horizontally conveying a vertically oriented pre-form in heat exchange proximity to a thermal conditioning means which includes (a) a source of gaseous coolant directed toward the parison and (b) a plurality of elongated, generally horizontal, vertically spaced radiant heating elements interposed between the source of gaseous coolant and the parison;
(2) rotating the pre-form as it is conveyed past the thermal conditioning means to continuously expose circumferential portions of the pre-form to simultaneous heating and cooling by said thermal conditioning means; and,
(3) thermally conditioning the pre-form during the performance of Steps (1) and (2) to a substantially uniform temperature across the thickness of the pre-form at each radial position by simultaneously (a) penetrating the thickness of that circumferential portion of the pre-form that is exposed to the thermal conditioning means with infra-red rays from said radiant heating elements and (b) flowing gaseous coolant essentially horizontally in a direction generally perpendicular to the direction of parison travel to flow at least a portion of the gaseous coolant directly onto the heating elements to cool the elements and extend their life and then onto the outer surface of the same circumferential pre-form portions that are exposed to said radiant heating elements.

7. In a method of forming a blown plastic container from an essentially tubular, heat degradable plastic parison consisting essentially of polyethylene terephthalate, the steps of:
vertically orienting the parison;
simultaneously moving the parison laterally and rotating the parison about its longitudinal axis adjacent to a thermal conditioning means comprise of (a) a source of air under pressure directed to the parison and (b) a plurality of horizontal, vertically spaced, generally parallel radiant heating elements interposed between the source of air and the parison, each heating element consisting of a tungsten filament encased within a quartz tube to provide radiant waves with a spectral energy peak wave length of about 1.2 micron;

while the parison is laterally conveyed and rotated adjacent the thermal conditioning means, flowing coolant air from said source generally horizontally in a direction essentially perpendicular to the direction of lateral parison movement, at least a portion of the coolant air impinging directly onto the heating elements to cool the elements and extend their life and then flowing the outer surface of the corresponding parison portions exposed to the heating elements to cool the parison surface to prevent thermal degradation, with the radiant waves from the heating elements penetrating the full wall thickness of the parison to establish a temperature gradiant across the thickness of the parison of no more than about 10° C.;

displacing the parison from adjacent the thermal conditioning means after the parison has been heated to a blowable temperature; and closing the sections of a blow mold on the parison and blowing the parison while at a blowable temperature to form a blown plastic container.

8. In a method of heating an essentially tubular, elongated pre-form prior to a blow molding operation, the steps of (1) positioning the pre-form in heat exchange proximity to a plurality of generally parallel, substantially aligned radiant heating elements which generate infra-red rays which penetrate the pre-form and bring the pre-form to a substantially uniform temperature throughout its thickness, with the longitudinal axis of the pre-form being oriented essentially perpendicular to the heating elements, (2) flowing gaseous coolant during the performance of Step (1) from a source in a direction generally perpendicular to both the heating elements and the pre-form, impinging the coolant directly onto the heating elements to cool the elements and extend their life and then flowing the coolant onto the corresponding surface portons of the pre-form adjacent to the heating elements to prevent the adjacent surface of the pre-form from becoming significantly hotter than the material throughout the thickness of the pre-form, and (3) displacing the pre-form from heat exchange proximity to the heating elements after the pre-form has been heated to a temperature suitable for a blow molding operation.

9. The method as defined in claim 8, further including the step of rotating the parison about its longitudinal axis during the performance of Steps (1) and (2).

* * * * *